FLUID CONTROLLED CAPSTANS WITH BRAKES

Filed Jan. 13, 1964 3 Sheets-Sheet 1

INVENTOR
ROBERT T. SMITH JR.
BY
Griffin and Stokes
ATTORNEYS

United States Patent Office 3,270,932
Patented Sept. 6, 1966

3,270,932
FLUID CONTROLLED CAPSTANS WITH BRAKES

Robert T. Smith, Jr., Hatboro, Pa., assignor to Sperry Rand Corporation, New York, N.Y., a corporation of Delaware Filed Jan. 13, 1964, Ser. No. 337,293
24 Claims. (Cl. 226—95)

The present invention relates to fluid gripping devices for use in the handling of flexible material in tape or web form, as in magnetic tape handling machines, punched paper tape handling machines, or the like. More particularly, the invention discloses a novel arrangement of pure fluid amplifiers wherein said amplifiers are used to change the pressure gradient across the flexible material.

In prior art fluid gripping devices, particularly devices used in the handling of high speed magnetic tape wherein the fluid utilized is air, it has been customary to switch the pressure gradient across the tape by means of a spool or other mechanical valve arrangement. Spool valves, however, have numerous disadvantages among which are the requirements for many complicated parts and extremely critical tolerances. As a result, the manufacturing and assembling of these parts is costly. Moreover, such complicated parts are usually found to be unreliable in normal operation. Another inherent disadvantage is that the valve must be mechanically moved between operating positions. If a high duty cycle is required of the valve, a bounce problem is created which lowers its efficiency. Also, some time is lost in overcoming the inertia of the mechanical valve mass so that there is a limit as to the response time of the valve when switching between positions.

The instant invention seeks to obviate the aforementioned difficulties and disadvantages by providing novel logical arrangements of pure fluid amplifiers which act to control the grasping or releasing of a web by a rotating capstan simultaneously with the respective releasing or grasping of the web by a brake surface. As known to those skilled in the art, pure fluid amplifiers have no moving parts so that mechanical wear of same is negligible. Furthermore, by use of pure fluid amplifiers there is no requirement of separate sources of positive and negative pressures in order to create pressure gradients of opposite polarities.

Therefore, one object of the present invention is to provide pure fluid control means for use in the fluid handling of tape, sheet, or web material.

Another object of the invention is to provide pure fluid pressure control means for use with counterrotating pneumatic capstans and pneumatic brakes.

Still another object of the invention is to provide pressure controlling means which readily lends itself to miniaturization.

These and other objects of the present invention will become apparent during the course of the following description to be read in view of the drawings, in which:

FIGURE 1 is a functional block diagram of the overall fluid system;

FIGURES 2A and 2B through 6A and 6B show various components and symbols therefore which are used in the system;

Figures 1, 2A, 2B, 3A, 3B, 4A, 4B, 5A, 5B:
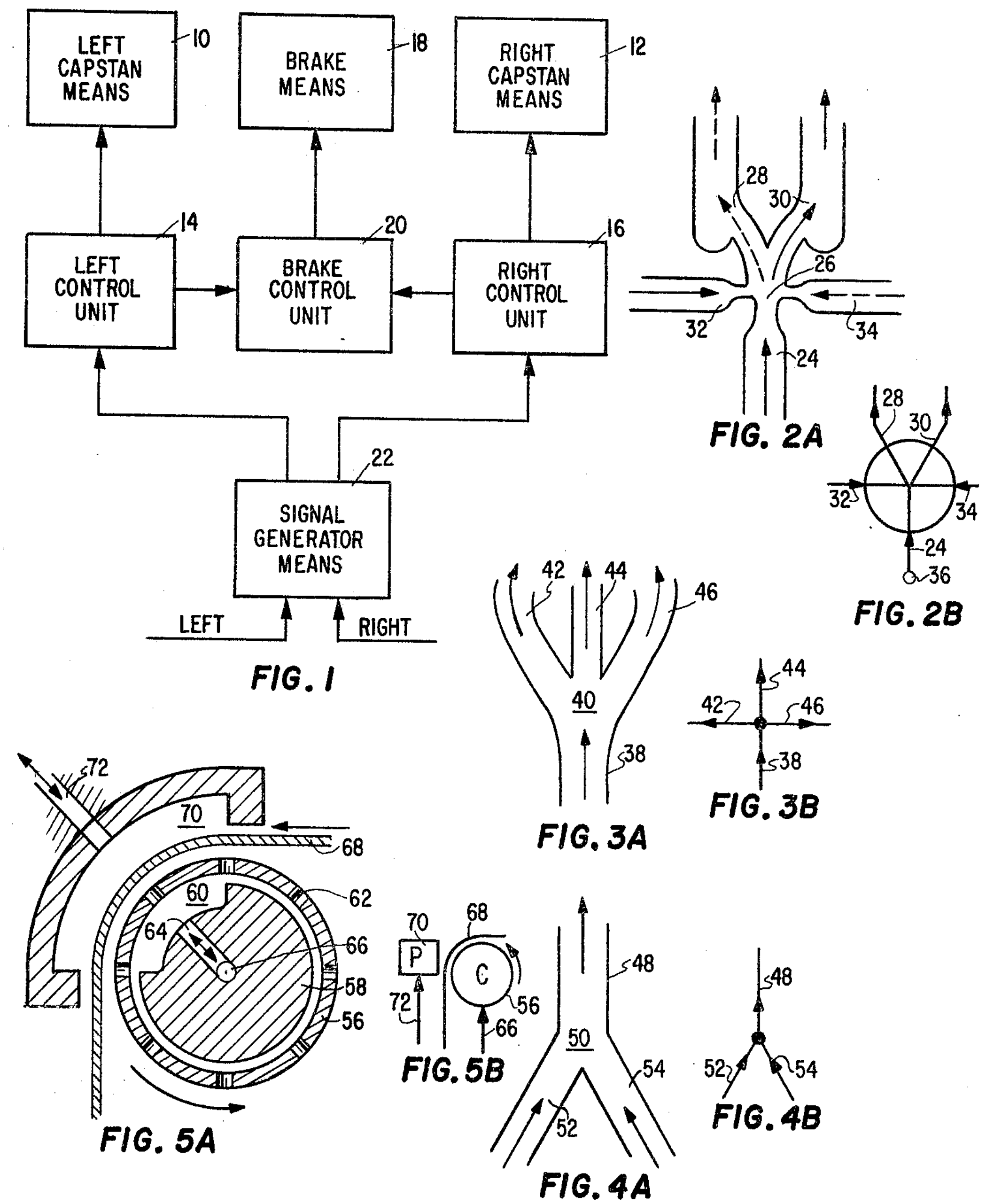

FIGURE 1 is a block diagram showing generally the organization of the functional components which comprise the present invention. Left capstan means 10 and right capstan means 12 are selectively controlled by left and right control units 14 and 16, respectively, to give a strip of flexible material, such as magnetic tape, motion either to the left or right, respectively. Also positioned adjacent the tape is brake means 18 which is selectively controlled by brake control unit 20 to arrest motion of the tape in the absence of actuation of either capstan means 10 or 12. In order to provide controlling signals to units 14, 16, and 20, a signal generator means 22 is responsive to either one of the commands Left or Right which in turn are supplied by means not shown and not part of the present invention. The particular novel signal generator means 22 employed in the present invention has the capability of issuing combinations of signals to the appropriate control units merely upon receipt of a single Left or Right command input. Details of the various functional blocks shown in FIGURE 1 will be given in subsequent paragraphs wherein the novel features of the invention will be readily apparent.

FIGURES 2 through 6 shows details of, and corresponding symbols for, the components used in the fluid logic circuits of FIGURES 7 through 10. Referring now to FIGURE 2A, there is shown one embodiment of a typical pure fluid amplifier of which this invention makes extensive use. This fluid amplifier comprises a power stream input channel 24 which terminates in an interaction chamber 26 from which branch two power stream output channels 28 and 30. Opposed control stream input channels 32 and 34 also terminate at interaction chamber 26, with said control channels being oriented so that they are substantially perpendicular to the power stream flow axis. Channel 24 is connected with a source of relatively high energy power stream fluid (not shown) which provides a fluid power stream flowing in the direction of the arrow into interaction chamber 26. By introducing a relatively low energy fluid control stream into interaction chamber 26 from either control channel 32 or 34, said power stream may be deflected in its course so as to emerge from the amplifier via either one of output channels 30 or 28, respectively. The amplifier is further constructed to be bistable such that the power stream remains flowing in the output channel to which it is last deflected by a control stream, even after termination of said deflecting control input fluid stream. A convenient way of providing this bistable characteristic is through design of the amplifier so that it will exhibit the well known boundary layer effect whereby a low pressure region is automatically developed between the power stream and a wall of an output channel. This produces a pressure differential across the power stream which maintains it in said output channel until an oppositely directed control stream is introduced into chamber 26. Thus, if a control stream is selectively introduced into chamebr 26 from control channel 32, the power stream is deflected to flow through output channel 30 whence it remains flowing even after termination of the channel 32 fluid stream. It now requires a control stream from channel 34 to deflect the power stream into output channel 28 whence it remains until a subsequent control signal is once again applied to channel 32. One further design feature of the fluid amplifier is the presence of complementary pressures appearing at its two outputs. For example, when a power stream flows through channel 28, it entrains fluid particles from channel 30. Thus, the pressure in channel 28 increases while that of channel 30 decreases. Conversely, when the power stream flows through channel 30 the opposite effect occurs in that the channel 28 pressure decreases while that of channel 30 increases. The use made of this feature will be described in subsequent paragraphs. FIGURE 2B shows the symbol which is used in FIGURES 7 through 10 for identitfying a fluid amplifier having the characteristics of the configuration shown in FIGURE 2A. The small circle 36 at the input of channel 24 indicates that said amplifier derives its power stream fluid from a continuously operating source.

FIGURE 3A illustrates a typical branched junction which receives a fluid stream and divides it into several portions. An input fluid channel 38 applies fluid flowing in the direction of the arrow to a junction 40 where upon said stream is separated into several portions each flowing through a different output channel. FIGURE 3A shows three such output channels 42, 44 and 46 although a junction may alternatively be provided with only two, four, or more such outputs. FIGURE 3B is the symbol representing such a junction in the FIGURES 7 through 10.

FIGURE 4A illustrates a typical combining junction henceforth termed an OR junction which produces an output fluid stream upon receipt of any one of several input fluid streams. For example, a single output channel 48 is connected with a junction 50 into which feed two input channels 52 and 54 each of which may contain fluid flow toward junction 50 at various times. In the absence of fluid in either channel 52 or 54 there is no output fluid in channel 48 flowing away from junction 50. However, if either or both of the channels 52 and 54 contain fluid streams flowing in the directions of the arrows, channel 48 also contains a fluid stream flowin the direction of the arrow. Consequently, the logical OR function is performed by the combining circuit of FIGURE 4A in that an output fluid signal is generated by the presence of any input thereto. FIGURE 4B is the symbol used for the OR junction in subsequent figures.

FIGURE 5A shows preferred components for imparting motion to a flexible web. A hollow cylinder or drum 56 rotates about a stationary inner member 58 which in turn has formed therein a depression 60 acting as a plenum chamber within the interior of rotating drum 56. Drum 56 contains apertures 62 spaced about its periphery which successively come into alignment with plenum chamber 60 as the drum rotates. Whatever fluid pressure exists within chamber 60 is therefore communicated via said ports 62 to the exterior surface of drum 56 as long as the port remains in registration with chamber 60. The static fluid pressure in chamber 60 is supplied by means of a fluid channel 64 which communicates via a further channel 66 with some source of changeable pressure, such as an output channel of the pure fluid amplifier in FIGURE 2A. A flexible web, such as magnetic tape 68, is adjacent to the rotating drum 56 so as to be either pressed against its exterior surface or held away therefrom according to the polarity of the pressure gradient across the tape. Normally said tape is situated in an atmospheric environment so that air is introduced or extracted from chamber 60. In order to enhance the magnitude of the pressure gradient across tape 68, an auxiliary plenum chamber 70 can be placed next to the other surface of tape 68. The pressure in said chamber 70 can be varied by means of some source connected to channel 72, said source preferably being the same fluid amplifier which is connected to channel 60. For this case, one output channel of the fluid amplifier is connected to chamber 60, while the other output channel is connected to chamber 70. Thus, when amplifier power stream flow is to chamber 60, the number of fluid particles therein increases to thereby raise the static pressure existing at the underside of tape 68, while the fluid particles in plenum 70 are extracted to thereby decrease the static pressure existing at the upper side of the tape. This makes the polarity of the pressure gradient across tape 68 such as to force the tape away from the surface of capstan 56 to thereby prevent motion from being imparted to the tape in the direction of capstan rotation. On the other hand, power stream flow into plenum 70 reverses the polarity of the pressure gradient to thereby force tape 68 into engagement with the rotating member 56. Tape 68 stays in positive engagement with one quarter of the drum 56 surface at any one time due to the fact that each port 62 registers with chamber 60 for only about a quarter of its revolution. However, this is sufficient to impart motion to web 68. It should further be noted that plenum 70 is not necessarily required, since the power stream pressure can be adjusted so that the pressure in chamber 60 is either greater than or less than the external environmental pressure. FIGURE 5B shows the symbols used to represent capstan components, with C representing the moving component including drum 56, and P representing the auxiliary plenum 70 if included as part of the system.

Figure 6A:
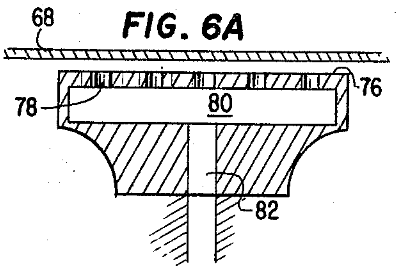
Figure 6B:
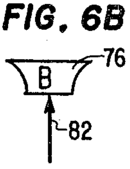

FIGURE 6A illustrates a typical brake component which has the function of stopping and holding said web 68. In general this consists of a stationary brake pad or surface 76 having a series of ports 78 which communicate with an inner plenum chamber 80. The static pressure in chamber 80 is communicated via ports 78 to one surface of web 68 so as to create a pressure gradient across said web in a manner similar to that created in the capstan components of FIGURE 5A. Pressure in chamber 80 may be varied between values above and below the external environmental pressure by the provision of a fluid channel 82 which in turn is connected with a source of variable pressure. FIGURE 6B is the symbol representing the brake component of FIGURE 6A.

Figure 7:
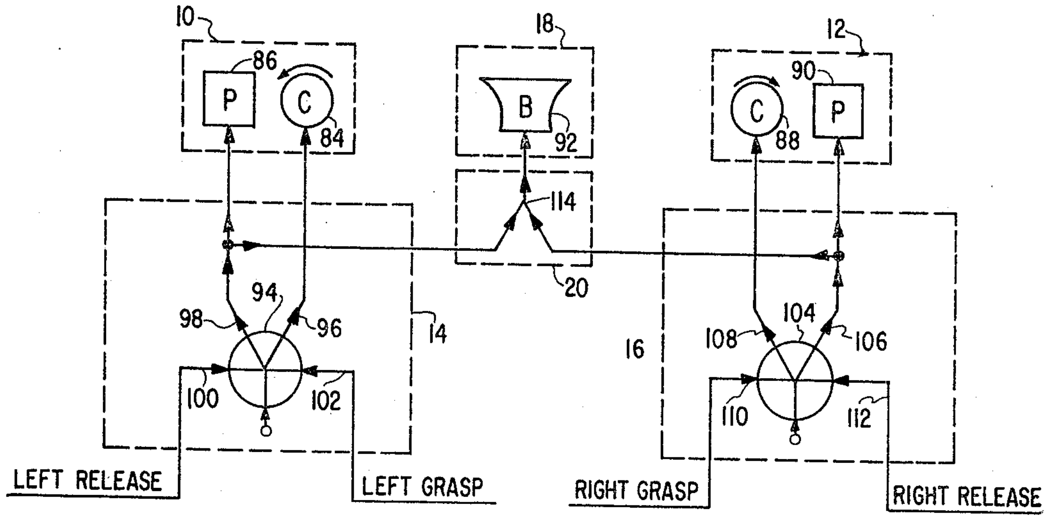
FIGURE 7 shows one novel embodiment of the basic subcombination of the system.

Referring now to FIGURE 7, there is shown in detail one species of a subcombination consisting of elements 10, 12, 14, 16, 18, and 20 of FIGURE 1. Left capstan means 10 consists of a rotating capstan 84 associated with a stationary auxiliary plenum 86 between which the flexible web, such as tape 68 in FIGURE 5A, is threaded. Capstan 84 has motion so that when the web is grasped thereby, said web moves to the left in FIGURE 7. Right capstan means 12 is similarly comprised of a rotating capstan 88 and stationary auxiliary plenum 90 for providing a force to move the web to the right when grasped by the capstan. The brake means 18 is comprised of a single break pad 92 which is preferably placed between the left and right capstan means so as to decelerate and then hold fast the tape whenever it is released from both capstans.

The left control unit 14 is comprised of a single fluid amplifier 94 whose right output channel 96 is connected with capstan 84 and whose left output channel 98 is connected with auxiliary plenum 86. The left control channel 100 is adapted to receive a temporarily applied fluid pulse designated as the Left Release signal, hereafter referred to as LR. The right control channel 102 of amplifier 94 is adapted to receive a temporarily applied fluid pulse designated as the Left Grasp signal, hereafter referred to as LG. A fluid pulse applied via control channel 100 deflects the amplifier 94 fluid power stream into output channel 96, whereas a fluid signal to control channel 102 deflects the power stream into output channel 98. In somewhat similar fashion, the right control unit 16 is comprised of a fluid amplifier 104 whose right output channel 106 is connected with plenum 90 and whose left output channel 108 is connected with rotating capstan 88. Its left control channel 110 is adapted to receive a temporarily applied fluid pulse designated as the Right Grasp signal and hereafter referred to as RG, while the right control channel 112 is adapted to receive a temporarily applied fluid pulse designated as the Right Release signal, hereafter referred to as RR.

Brake control unit 20 in the embodiment of FIGURE 7 is comprised of merely a single OR junction 114 whose two inputs are respectively connected to output channel 98 of amplifier 94 and output channel 106 of amplifier 104. Thus, when the power stream of amplifier 94 is directed through its output channel 98, said power stream is separated into two portions one of which flows to plenum 86 and the other flows to OR junction 114 from whence it is directed to brake 92. A power stream in output channel 106 of fluid amplifier 104 likewise is separated into two portions which respectively flow to plenum 90 and to brake 92, the latter via OR junction 114.

The operation of FIGURE 7 will now be described. To prevent motion of the tape, the continuously flowing power streams of amplifiers 94 and 104 are caused to flow into output channels 96 and 108, respectively, by LR and RR fluid pulses applied to control channels 100 and 112, respectively. Positive pressures thus exist in these two output channels and are communicated to the two rotating capstans 84 and 88 so as to cause the tape to float above each without motion in either direction. Complementary negative pressures exist in each output channel 98 and 106 and are communicated to both of the auxiliary plenums 86 and 90 as well as to both inputs of OR junction 114. Consequently, a negative pressure is communicated to the interior plenum chamber of brake 92 which is adjusted to be less than the external environmental pressure so as to cause the tape to be firmly forced against and thus grasped by the brake surface.

To move the tape to the left, the power streams of amplifiers 94 and 104 are caused to flow into output channels 98 and 108, respectively, by applied LG and RR signals to control channels 102 and 112, respectively. A power stream in channel 98 thus produces positive pressure in plenum 86 and a negative pressure in capstan 84 so as to create a pressure gradient causing said tape to be firmly grasped by the rotating capstan. The power stream in output channel 108 of amplifier 104 creates the same pressure differential described in the preceding paragraph such that the tape floats above capstan 88 without being given motion to the right thereby. The positive pressure in output channel 98 is also communicated to brake 92 via OR junction 114 not withstanding the fact that the pressure in channel 106 of amplifier 104 still remains at a negative value. Consequently, positive pressure from brake 92 causes the web to float thereabove without any restraining influence upon its leftward motion.

To move the tape to the right, the power streams must flow through output channels 96 and 106 of fluid amplifiers 94 and 104, respectively, in order to cause the tape to float above capstan 84 and brake 92 while being grasped by capstan 88. These power stream flows are obtained by applying an LR pulse and an RG pulse to the respective amplifiers so as to create positive pressures in channels 96 and 106, and negative pressures in channels 98 and 108. The positive pressure of channel 106 is communicated to brake 92 via OR junction 114.

The sequence of applying the signals LR, LG, RG, and RR to FIGURE 7 is somewhat optional with the exception that power streams of the two amplifiers should never simultaneously flow in respective output channels 98 and 106, since to do so would cause tape to be pulled in both directions by the counterrotating capstans. This places undesirable tension in the tape. Therefore, signals LG and RG cannot be applied simultaneously, nor can either be applied after the other without there having been an intervening release signal of the proper kind. The LR and RR signals can be applied simultaneously, or in immediate succession. If the tape is stopped, either the LG or the RG signal can be applied. If the LG signal is applied, the tape moves to the left and continues to do so until the LR signal is applied to stop its motion. Between the LG and LR signals there should not be applied the RG signal. On the other hand, if the tape is moving to the left then the LR and RG signals can be applied simultaneously which will cause the tape to immediately begin moving to the right without any undesirable effects. In similar fashion, if the tape is moving to the right, then the RR signal may be applied either singly or simultaneously with the LG signal.

Figure 8:
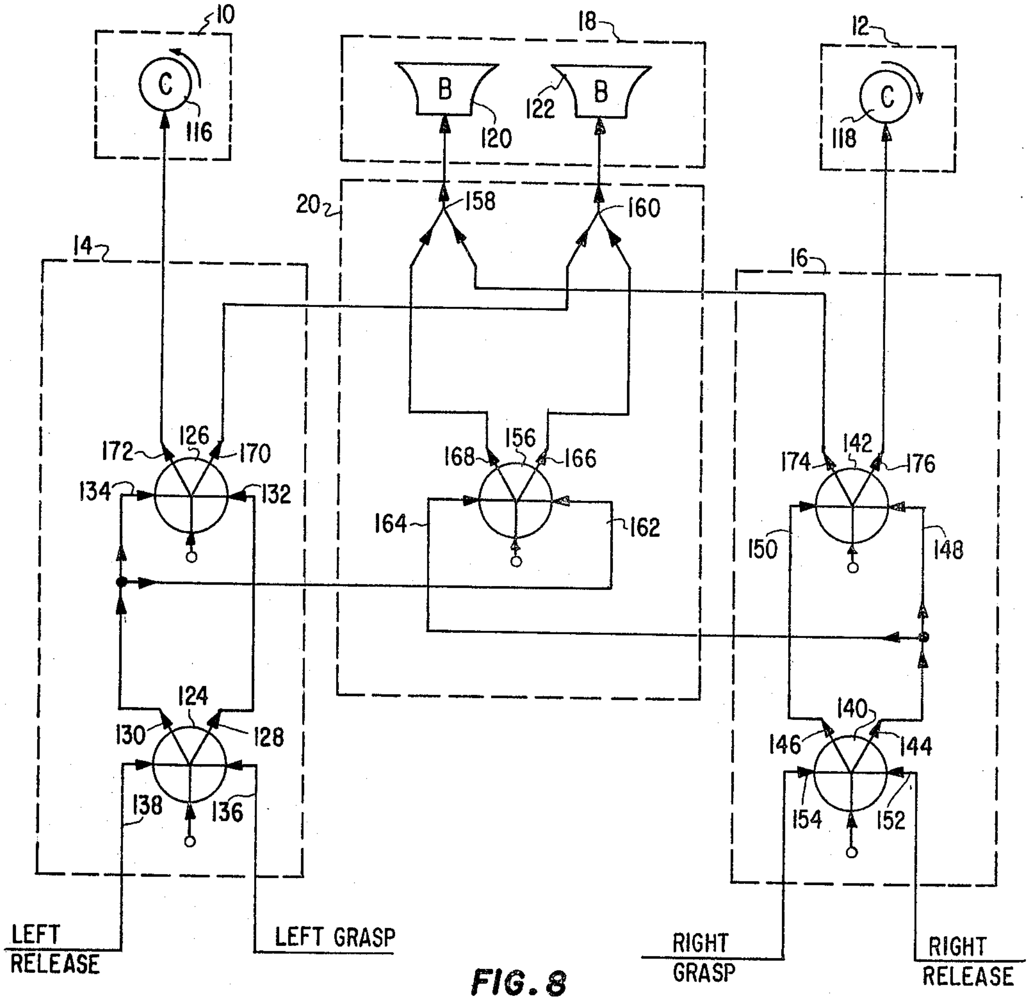
FIGURE 8 shows another novel embodiment of said basic subcombination.

FIGURE 8 illustrates a second species of the subcombination comprised of elements 10, 12, 14, 16, 18, and 20 in FIGURE 1. Each of the capstan means 10 and 12 in FIGURE 8 has only a rotating capstan 116 and 118, respectively. However, the pressures transmitted to each capstan are designed to range from below to above the external environmental pressure so as to selectively create pressure gradients of opposite polarity in order to cause the tape to either abut or to float freely above the capstan. Brake means 18 of FIGURE 8 is comprised of two brake pads 120 and 122 each of which is adjacent the tape. Tape motion may be arrested by using either one of the brake pads. Left control unit 14 has two fluid amplifiers 124 and 126 which are connected in tandem such that output channels 128 and 130 of the former are respectively connected to control channels 132 and 134 of the latter. Control channels 136 and 138 of amplifier 124 are adapted to respectively receive LG and LR fluid signals. Right control unit 16 also has two fluid amplifiers 140 and 142 connected in tandem. Output channels 144 and 146 of amplifier 140 provide control pulses to control channels 148 and 150, respectively, of amplifier 142, while control channels 152 and 154 of amplifier 140 respectively receive RR and RG fluid pulse signals.

The brake control unit 20 in FIGURE 8 is comprised of a single fluid amplifier 156 and two OR junctions 158 and 160. Control channels 162 and 164 of the amplifier are respectively connected to output channels 130 and 144 of respective amplifiers 124 and 140. Output channels 166 and 168 of amplifier 156 are connected to one input of the OR junctions 160 and 158, respectively. The other input to OR junction 160 is connected to output channel 170 of amplifier 126 whose other output channel 172 in turn is connected with capstan 116. The other input to OR junction 158 is connected to output channel 174 of amplifier 142 whose other output channel 176 in turn is connected with capstan 118.

To stop the motion of the tape, the power streams of amplifiers 124 and 140 must flow through their respective output channels 128 and 146. This is accomplished by applying the LR and RR fluid pulses to respective control channels 138 and 152. Power stream flow in output channel 128 serves as a control stream input to amplifier 126, being applied thereto via control channel 132. This forces the power stream of amplifier 126 into its output channel 172 from whence it is applied to capstan 116 to produce a positive pressure therein causing the tape to float above said capstan. In like fashion, power stream flow in output channel 146 of amplifier 140 is applied as an input control stream to amplifier 142 via its control channel 150 so as to produce power stream flow in channel 176 to capstan 118. The tape therefore also floats above this capstan.

The above described power stream flow through output channels 172 and 176 of amplifiers 126 and 142, respectively causes negative pressures in the other output channels 170 and 174. Thus, each of the OR junctions 158 and 160 has at least one negative pressure input. Control amplifier 156 is in a condition whereby power stream output flow therefrom is in either channel 166 or 168. Assuming that said flow is in output channel 166, it is seen that OR junction 160 has applied thereto a positive pressure input which is transmitted to brake pad 122 in order to cause the tape to float above its surface. A negative pressure now exists in the other output channel 168 which is communicated to OR junction 158. OR junction 158 has negative pressures applied to both of its inputs which in turn makes negative its output to brake pad 120. Therefore, brake 120 engages the tape to prevent motion thereof. If it is alternatively assumed that power stream flow in amplifier 156 is through its output channel 168, then OR junction 160 has a negative pressure output which, when applied to brake 122, causes engagement of tape thereby. Consequently, if negative pressures exist in both output channels 170 and 174 of amplifiers 126 and 142, respectively, at least one brake pad 120 or 122 will be engaged with the tape regardless of the state of amplifier 156.

For tape motion to the left, it is necessary that power stream flow in amplifier 124 be through its output channel 130, while power stream flow in amplifier 140 be through its output channel 146. Said flow in amplifier 140 produces the same result as was discussed above in connection with a non-moving tape, i.e., the tape floats above capstan 118 and OR junction 158 receives one negative pressure input from output channel 174 of amplifier 142. Power stream flow through channel 130 of amplifier 124 is caused by the application of a LG fluid pulse. This power stream flow is then applied to amplifier 126 as to deflect the latter's power stream into its output channel 170. A negative pressure then exists in channel 172 which, when applied to capstan 116, causes engagement of the tape to impart leftward motion thereto. The positive pressure existing in channel 170 is communicated to brake 122 via OR junction 160 notwithstanding the negative pressure value existing in output channel 166 of amplifier 156. Power stream flow in channel 130 of amplifier 124 is also directed to amplifier 156 via control channel 162 to deflect its power stream through output channel 168 and from thence to OR junction 158. Consequently, it is seen that each OR junction 158 and 160 has applied at least one positive pressure input thereto which in turn forces the tape to float above both of the brakes 120 and 122.

To provide tape motion to the right, amplifiers 124 and 140 must have power stream flow in their respective output channels 128 and 144. Such flow requires application of the LR and RG signals. Power stream flow in output channel 128 of amplifier 124 causes a positive pressure to be applied to capstan 116 in the manner previously described in connection with a non-moving tape. Power stream flow in output channel 144 of amplifier 140 deflects the power stream of amplifier 142 into its output channel 174, thereby generating a negative pressure in output channel 176 which in turn causes the tape to be grasped by capstan 118. The positive pressure now in output channel 174 is also communicated to OR junction 158 and from there to brake 120. Furthermore, the power stream in output channel 144 of amplifier 140 is applied to control input 164 of amplifier 156. This makes power stream fluid through output channel 166 to OR junction 160 so that brake 122 also receives a positive pressure. The tape therefore floats above both brakes 120 and 122 during the time that it is being moved to the right by capstan 118.

The sequence of application of the signals LR, LG, RG, and RR in FIGURE 8 is governed by the same criteria as that explained in connection with FIGURE 7. That is, the LG and RG signals should not be simultaneously applied, nor should they be applied in succession without first having a proper intervening release signal. The LR and RG signals, or LG and RR signals may be applied in sequence or simultaneously to effect an immediate reversal of tape motion. Alternatively, the LG, LR, and RG signals may be applied in this sequence in order to move the tape left, stop same and then move to the right. Similarly, the RG, RR, and LG signals may be applied in that sequence in order to move the tape to the right, stop same, and then move it to the left.

Figure 9:
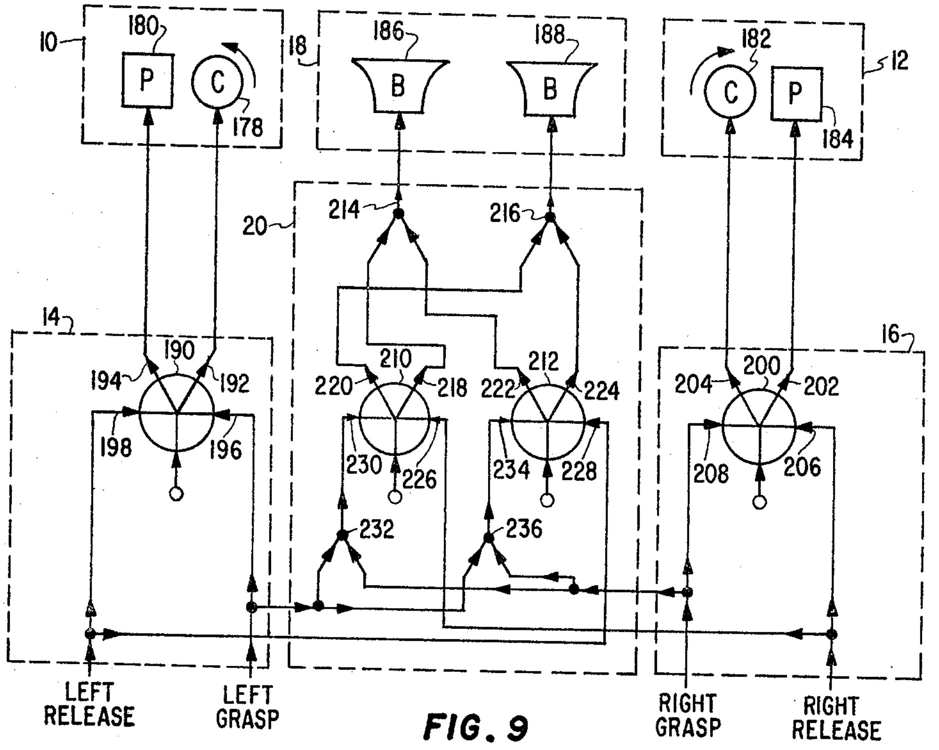
FIGURE 9 shows a third novel embodiment of said basic subcombination.

FIGURE 9 shows still another embodiment of that FIGURE 1 subcombination made up of elements 10, 12, 14, 16, 18, and 20. As in FIGURE 7, capstan means 10 and 12 consist of a rotating member 178 and stationary auxiliary plenum 180, and rotating member 182 and stationary plenum 184, respectively. Brake means 18, as in FIGURE 8, consists of two brake pads 186 and 188 either of which can arrest motion of the tape by pneumatically grasping same. Left control unit 14 consists of a single fluid amplifier 190 whose right output channel 192 is connected with capstan 178 and whose left output channel 194 is connected with plenum 180. The right and left control input channels 196 and 198 of amplifier 190 respectively receive the LG and LR fluid signals. Right control unit 16 likewise consists of a single fluid amplifier 200 whose output channels 202 and 204 are respectively connected with capstan 184 and plenum 182 of capstan means 12. Control inputs 206 and 208 receive the RR and RG fluid pulse signals, respectively.

Brake control unit 20 is more complicated than that shown in either FIGURES 7 or 8 previously described. It consists of two fluid amplifiers 210 and 212 and four OR junctions 214, 216, 232, and 236. OR junctions 214 and 216 have outputs which are respectively connected with brake pads 186 and 188. Output channels 218 and 220 of amplifier 210 are respectively connected to one input of different OR junctions 214 and 216, while output channels 222 and 224 of amplifier 12 are connected to the other inputs of said OR junctions. Control channel 226 of amplifier 210 receives the RR fluid signal, while control channel 228 of amplifier 212 receives the LR fluid signal. Connected with control channel 230 of amplifier 210 is the OR junction 232 which has one input receiving the LG fluid signal and the other input receiving the RG signal. In similar fashion, the control channel 234 of amplifier 212 is connected to the output of OR junction 236 which in turn receives the LG and RG signals.

The operation in FIGURE 9 is as follows. For tape motion to cease, there must be power stream flow in output channel 192 of amplifier 190, and channel 204 of amplifier 200. This is accomplished by applying the LR and RR fluid signals so that positive pressures are applied to capstans 178 and 182, with negative pressures applied to stationary plenums 180 and 184. The LR signal is also applied to amplifier 212 so that its power stream flows through channel 222 to OR junction 214 and from there to brake 186. Thus, a positive pressure is present at the surface of brake 186 which causes the tape to float thereabove. A negative pressure exists in channel 224 of amplifier 212. The RR fluid signal is also applied to amplifier 210 so as to direct its power stream through channel 220 to OR junction 216 and from thence to brake 188. Consequently, the tape also floats above brake 188. For the above states of the four amplifiers in question, it is seen that the tape is not grasped by either capstan nor by either brake member. This differs somewhat from the circuits of FIGURES 7 and 8 wherein there is always brake action whenever the tape is stopped.

With the above described condition, wherein the tape floats above all capstan and brake members, assume that it must be moved to the left. By applying the LG signal, the power stream of amplifier 190 is shifted to channel 194 so as to create a grasping pressure gradient at capstan means 10. The LG signal is also applied to one input of each OR junction 232 and 236 for communication to both amplifiers 210 and 212. This causes the power stream of each to now flow through channels 218 and 224, respectively, in order to continue the application of positive pressure to both brakes 186 and 188 via respective OR junctions 214 and 216. Thus, when the tape is grasped and moved by left capstan member 178, it remains disengaged from brake means 18.

To now decelerate and stop a tape which is traveling to the left, the LR signal is applied. In amplifier 190 said signal causes the power stream to once again flow through channel 192 to float the tape above rotating capstan remember 178. The LR signal is also applied to amplifier 212 in order to switch its power stream into output channel 222 from whence it is directed to brake 186 via OR junction 214. Consequently, the tape continues to float above brake 186. However, amplifier 210 remains in the condition whereby its power stream flows through channel 218 to OR junction 214. Consequently, although OR junction 214 now has positive pressures applied to both of its inputs, OR junction 216 now has negative pressures applied to both inputs. Thus a negative pressure is communicated to brake 188 which thereupon grasps the moving tape and quickly slows it down to zero velocity.

After the tape has been stopped from moving to the left, it can accelerate to the right by now applying the RG signal. This signal switches the power stream of amplifier 200 into channel 202 so as to create a pressure gradient at capstan means 12 which will force the tape against rotating member 182. This RG signal is also applied to both OR junctions 232 and 236 in order to cause the power streams of both amplifiers 210 and 212 to flow into channels 218 and 224, respectively. These power stream flows then provide positive pressures at both brake means 186 and 188 which in turn frees the tape from the braking influence. By subsequently applying the RR signal to the circuit at a time when the tape is moving to the right, the power stream of amplifier 200 is switched backed to channel 204, while the power stream of amplifier 210 is switched into channel 220. The power stream of amplifier 212 remains in channel 224 whence it was switched by the previously applied RG signal. Therefore, OR junction 216 has power stream fluid applied to both of its inputs, whereas OR junction 214 has no power stream input. This permits brake 186 to grasp the tape and decelerate it to a stop position from its rightward motion. By now once again applying the LG signal, the tape is accelerated to the left as previously described. On the other hand, by instead applying the LR signal, the brake means 18 is caused to entirely release the tape due to the fact that the power stream of amplifier 212 is moved to channel 222.

The permissible sequences of signal application to FIGURE 9 are identical with those of FIGURES 7 and 8. For example, LG, LR, and RG may be applied in that sequence, as well as RG, RR, and LG. LG and RG should not be applied simultaneously or in immediate sequence without the proper intervening release signal. Furthermore, if the tape is moving to the right, then LG and RR signals may be applied simultaneously in order to quickly reverse direction. This simultaneous application of these two signals to both control channels 230 and 226 of amplifier 210 nullify each other and prevent the power stream therein from switching away from channel 218 to channel 220. Thus, brakes 186 and 188 remain in a condition whereby the tape floats above both. In similar fashion, if the tape is moving to the left, then RG and LR may be simultaneously applied in order to quickly reverse motion, since the simultaneous application of opposed control streams in amplifier 212 nullify each other in order to prevent the power stream switching from channel 224 to channel 222. LR and RR may also be simultaneously or sequentially applied in order to completely free the tape from any of the capstan or brake members.

Figure 10:
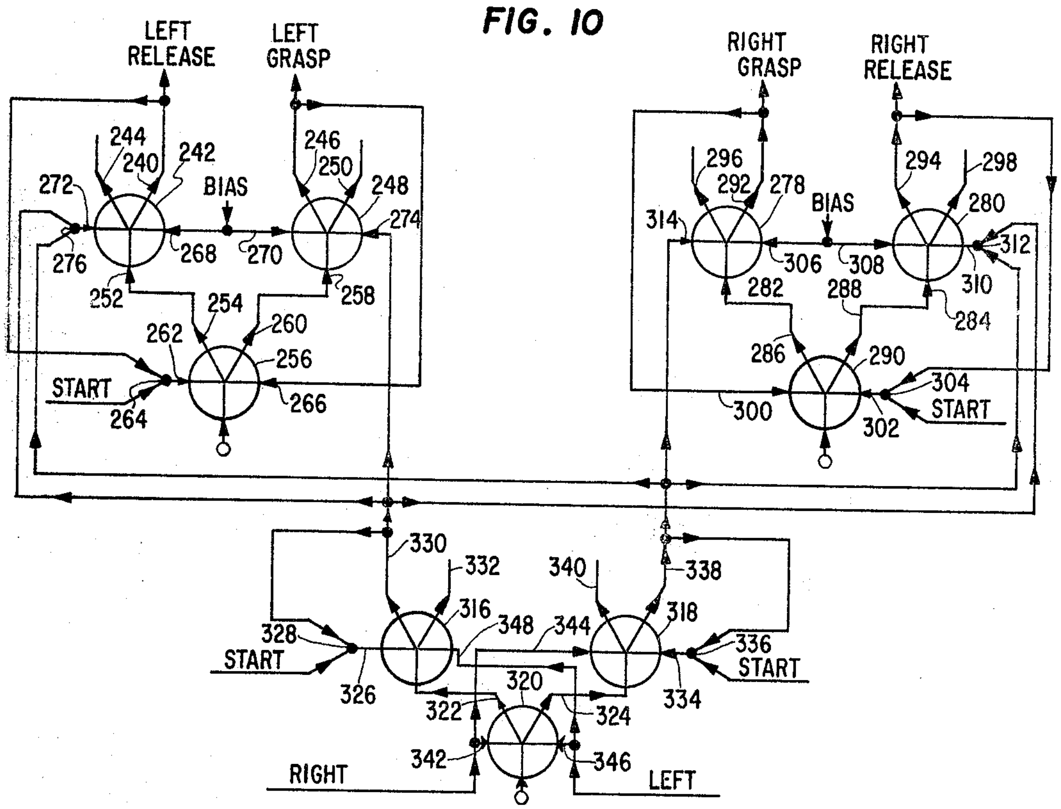
FIGURE 10 shows a novel embodiment of an input signal generator subcombination which can be used with any one of said basic subcombination embodiments.

Since the LR, LG, RG, and RR signals may be generated by individual and relatively simple fluid means for any ot the subcombinations of FIGURES 7, 8, and 9, it is seen that each said subcombination has utility by itself without need for the signal generator unit 22 in FIGURE 1. However, FIGURE 10 shows the details of a novel signal unit 22 wherein the LR, LG, RG, and RR signals may be generated either singly or simultaneously in certain combinations. The LR signal pulse appears at the output channel 240 of a fluid amplifier 242 whose other output channel 244 exhausts back to the input of its power stream source. The LG signal appears at the output channel 246 of a fluid amplifier 248 whose other output channel 250 likewise exhausts back to its power stream source. The power stream input channel 252 of amplifier 242 is itself connected to the output channel 254 of a fluid amplifier 256. Similarly, the power stream input channel 258 of amplifier 248 is connected to the output channel 260 of said fluid amplifier 256. Therefore, each of the fluid amplifiers 242 and 248 derives its power stream fluid from the output channels of amplifier 256 but only when the power stream of amplifier 256 flows through the associated output channel.

The direction taken by the power stream in amplifier 256 is determined by the particular control signal applied thereto. Control channel 262 is connected to an OR junction 264 which in turn has one input derived from output channel 240 of amplifier 242, such that a portion of the Left Release fluid signal is returned to this control channel of amplifier 256. The other input to OR junction 264 receives a fluid pulse signal designated as Start, which is generated only to preset the system to an initial condition subsequently to be described. Control channel 266 of amplifier 256 is connected with channel 246 of amplifier 248 so as to receive part of the LG fluid signal generated by said channel.

Control signals to amplifiers 242 and 248 are derived from a variety of sources. An extremely low energy fluid source, identified as Bias, continuously supplies fluid to control channels 268 and 270 of amplifiers 242 and 248, respectively. This Bias fluid has sufficient energy to switch each amplifier power stream into its exhaust output channel only during the absence of a fluid control signal at the opposite control channels 272 and 274, respectively. Channel 272 of amplifier 242 is connected to an OR junction 276 which is adapted to receive fluid from sources subsequently to be described. Channel 274 also will have its input source described later on.

The RG and RR fluid signals are produced from a fluid amplifier circuit which is practically identical to that described above for LG and LR. Fluid amplifiers 278 and 280 have their respective input channels 282 and 284 connected to output channels 286 and 288, respectively, of amplifier 290. Channel 292 of amplifier 278 produces the RG signal, while channel 294 of amplifier 280 produces the RR signal. The other channel of each amplifier exhausts back to its source of power stream fluid. Amplifier 290 derives one control signal via channel 300 from channel 292 of amplifier 278. Channel 302 is connected to an OR junction 304. This junction has one of its inputs connected to channel 294 so as to receive part of the RR signal. The other input to OR junction 304 receives the same initial Start signal which is applied to OR junction 264.. Control channels 306 and 308 of amplifiers 278 and 280, respectively, receive the low energy Bias fluid which is continuously applied thereto and which only has an effect on a power stream in the absence of an opposed control stream to the amplifier. Control channel 310 of amplifier 280 is connected to OR junction 312 which in turn receives fluid pulses subsequently to be described. Control channel 314 of amplifier 278 also receives a control signal described later.

The controlling fluid signals applied to the LR-LG and RG-RR fluid amplifiers are derived from a third group of three fluid amplifiers 316, 318, and 320. The power stream input channels of amplifiers 316 and 318 are respectively connected to the output channels 322 and 324 of amplifier 320. Control channel 326 of amplifier 316 is connected to an OR junction 328 which in turn has one input from output channel 330 of amplifier 316. The other input to OR junction 328 is adapted to receive the same initial Start signal which is applied to amplifiers 256 and 290. The other output channel of 332 of amplifier 316 exhausts back to the source of power stream fluid. In similar fashion, control channel 334 of amplifier 318 is connected to OR junction 336 having one input from output channel 338 and the other input adapted to receive the initial Start pulse previously described. The other output channel 340 of amplifier 318 exhausts back to the source of power stream fluid.

Applied to control channels 342 of amplifier 320 and 344 of amplifier 318 is a fluid command signal designated as Right. Applied to control channel 346 of amplifier 320 and also to control channel 348 of amplifier 316 is a fluid command signal designated as Left. These commands Right and Left are selectively generated by circuitry not shown and not forming part of the present invention In general, successive applications of the Right command, without intervening applications of the Left command, cause the signals RR and RG to be alternately generated. Successive applications of the Left command, without intervening applications of the Right command, cause the signals LR and LG to be alternately generated. If the Right and Left commands are alternately applied, then a pair of simultaneously generated LG and RR signals alternate with a pair of simultaneously generated LR and RG signals.

To see how FIGURE 10 performs the above described functions, assume first that the Start fluid is temporarily applied at the time when the system is initially turned on. If power stream flow in amplifier 320 is through channel 322 to amplifier 316, the Start fluid to channel 326 causes said power stream to exhaust via channel 332. On the other hand, if power stream flow in amplifier 320 is through channel 324 to amplifier 318, the Start fluid at channel 334 causes said power stream fluid to exhaust via channel 340. In either event, the Start fluid to amplifiers 316 and 318 definitely prevents power stream flow in either channel 330 or channel 338 no matter what the condition of amplifier 320. This same Start fluid also insures that the power stream of amplifier 256 flows through channel 260 to amplifier 248. Since there exists no fluid in channel 330 at this time, the Bias fluid to channel 270 causes the power stream in amplifier 248 to exhaust via channel 250. Similarly, the Start fluid applied to amplifier 290 insures that its power stream is directed via channel 286 to amplifier 278, wherein the continuously supplied Bias fluid thereafter directs said power stream fluid through channel 296. The FIGURE 10 signal generating means is therefore initially set to a condition from which proper operation may be commenced. For this initial condition there is no signal existing in any of the output channels 240, 246, 292 or 294.

Now assume that it is desired to generate a LG signal which, when applied to any of the FIGURES 7, 8, or 9, will cause tape motion to the left. The Left command is applied to amplifier 320 to switch its stream through channel 322 to amplifier 316. This Left command is also applied to control channel 348 of amplifier 316 and is present just long enough to insure that the power stream flows through channel 330. A portion of this power stream in channel 330 is diverted back to OR junction 328 and from there to amplifier 316 in order to later switch said power stream back into exhaust channel 332. Before this switch back occurs, however, the power stream in channel 330 is applied to OR junction 276, channel 274, and OR junction 312 of amplifiers 242, 248, and 280, respectively. However, of this group only amplifier 248 has power stream flow therein which is exhausting through channel 250. Consequently, the power stream of amplifier 248 is diverted to channel 246 from whence a portion of it becomes the LG signal to be applied to the circuits in the previous figures. A portion of the power stream in channel 246 is also diverted back to channel 266 of amplifier 256. This portion now switches the power stream into channel 254, thus terminating the LG signal appearing in channel 246. Power stream flow in channel 254 is now directed to amplifier 242. However, by the time that power stream flow commences in amplifier 242, the power stream flow in channel 330 has been terminated because of the feedback fluid applied to OR junction 328. Consequently, only the Bias fluid remains applied to control channel 268 of amplifier 242 which is sufficient to direct the power stream to channel 244. This prevents the LR signal from being generated at this time.

If it is next desired to generate only the LR signal while the tape is moving left, the Left command is once again applied to amplifier 320. Power stream flow again occurs temporarily in channel 330 and remains there until the feedback signal via OR junction 328 causes it to once again exhaust through channel 332. This power stream fluid in channel 330 is applied to amplifiers 242, 248, and 280 as was explained above. However, by this time there is only power stream flow in amplifier 242 of this group. Consequently, power stream flow in amplifier 242 is diverted to output channel 240 from whence a portion of it becomes the LR signal which, when applied to any of the circuits in the preceding figures, is sufficient to stop tape motion to the left. A portion of the LR signal is also returned to amplifier 256 via OR junction 264 in order to divert its power stream into channel 260. This diversion thereupon terminates the LR signal since amplifier 242 no longer has input power fluid. Power stream flow is now directed to amplifier 248, but it arrives there subsequent to the termination of power stream flow in channel 330. The continuously flowing bias fluid at channel 270 causes the now appearing power stream fluid in amplifier 248 to exhaust via channel 250, thereby preventing generation of the LG signal at this time.

The condition of FIGURE 10 is now exactly the same as set by the Start fluid. If the Left command is applied successively, the LG and LR signals are alternately generated. Similarly, FIGURE 10 operates to alternately generate the RG and RR signals whenever the Right command is successively applied to amplifier 320. This generation of the RG and RR signals is believed to be obvious in view of the above detailed description of the generation of the LR and RG signals. What remains to be described is the simultaneous generation of pairs of signals from FIGURE 10 due to the alternate application of the Right and Left commands. Assume first that the application of a Left command has resulted in the generation of the LG signal in the manner previously described. FIGURE 10 is now in a condition of power stream flow in amplifier 242 through channel 244, and power stream flow in amplifier 278 through channel 296. Power stream flow also occurs in amplifier 316 through channel 332. If now a Right command is applied to amplifier 320, it switches power stream flow into channel 324 from whence it flows to amplifier 318. The Right command is also applied to amplifier 318 so as to divert power stream flow into channel 338 from whence it is applied simultaneously to amplifiers 242, 278, and 280. Power stream flow in amplifier 242 is thus diverted to channel 240 to generate the LR signal which disengages the tape from the left capstan means. Part of this LR signal is also returned to amplifier 256 to divert its power stream flow into amplifier 248 from whence it exhausts via channel 250. Simultaneously with the generation of the LR signal, the application of power fluid to amplifier 278 causes its power stream flow to exit via channel 292. This produces the RG signal simultaneously with the production of the LR signal. As before described, the simultaneous production of this signal pair causes an immediate reversal of tape motion from left to right. Part of the RG signal is returned to amplifier 290 whence it changes the power stream flow into channel 288. Consequently, amplifier 280 receives power stream flow which is exhausted through channel 298 by virtue of the Bias fluid. It should be noted that the fluid in channel 338 of amplifier 318 has been terminated by the time that power stream flow commences in amplifier 280, because of the feedback from channel 338 to OR junction 336.

If, subsequent to the application of said above Right command, another Left command is applied, then LG and RR signals are simultaneously produced from amplifiers 248 and 280, respectively. This is done in the following manner. The Left command creates power stream flow in channel 330 of amplifier 316, said flow being simultaneously applied to amplifiers 242, 248, and 280. As will be remembered, there is power stream flow in both amplifier 248 and amplifier 280 at the conclusion of the previously applied Right command. Consequently, power stream fluid appears in output channels 246 and 294 simultaneously with each other so as to generate the signal pair LG and RR. This immediately reverses tape motion from right to left in any of the preceding figures as has been previously explained. Power stream flow is then shifted to channel 244 of amplifier 242 and also to channel 296 of amplifier 278. FIGURE 10 is now in a condition whereby a subsequent application of another Right command will once again simultaneously generate the signals RG and LR. At this point it may be mentioned that the energy of the Bias fluid applied to control stream input channels 268, 270, 306, and 308 in FIGURE 10 can actually be of sufficient magnitude to deflect a power stream only at the time when power stream fluid is initially applied to a fluid amplifier, since the stable characteristic of the output channels 244, 250, 296, and 298 insures that power stream flow thereafter remains locked therein until subsequent application of fluid to the control stream input channels 272, 274, 314, and 310.

It is accordingly obvious that amplifiers 242, 248 and 256 and their associated connecting channels comprise a first pure fluid bistable circuit means and amplifiers 278, 280 and 290 and their associated connecting channels comprise a second pure fluid bistable circuit. The first pure fluid bistable circuit is bistable in that its output tends to remain in either channel 244 or channel 250 unless a shifting signal is introduced into the circuit. The second pure fluid bistable circuit is bistable in the same manner with respect to channels 296 and 298. The first pure fluid bistable circuit is controlled by signals from first and second control input channels 274 and 272 respectively and the second pure fluid bistable circuit is controlled by signals from third and fourth control input channels 314A and 310. It should also be noted that simultaneous pulses are applied through channels 274, 272 and 310 (first, second and fourth control input channels) by channel 330 and channels 272, 310 and 314 (second, third and fourth control input channels) receive simultaneous pulses from channel 338.

Although each of the logical OR elements in FIGURES 7 through 10 have been shown as a passive fluid combining junction, an active OR element may be substituted therefore such as a pure fluid amplifier having a plurality of control input channels on the same side of its fluid interaction chamber. Furthermore, it is to be understood that a logical OR function is very simply obtained in each of these figures by merely connecting, as in FIGURE 7, each power stream output channel 98 and 106 directly with the brake plenum chamber via individual ports therein rather than through a separate combining junction or other element. Thus, the term or phrase "logical OR element" as used in the claims is meant to include such modified structure. Other changes and modifications may also be obvious to those skilled in the art without departure from the novel principles defined in the appended claims.

The embodiments of the invention in which an exclusive property or privilege is claimed are defined as follows:

1. A web transport device which comprises:

(a) first and second web drive means each located adjacent a web path for moving a web grasped thereby, with each said drive means being adapted to receive fluid energy in either a first state or a second state for selectively creating across the web a fluid pressure gradient of either web grasping polarity or web releasing polarity, respectively;

(b) web brake means located adjacent said web path for restraining movement of a web grasped thereby, said web brake means being adapted to receive fluid energy in either a third state or a fourth state for selectively creating across the web a fluid pressure gradient of either web grasping polarity or web releasing polarity, respectively;

(c) first pure fluid amplifier means responsive to either a selectively generated first fluid grasp signal or a selectively generated first fluid release signal for respectively supplying first state fluid energy or second state fluid energy to said first web drive means; and second pure fluid amplifier means responsive to either a selectively generated second fluid grasp signal or a selectively generated second fluid release signal for respectively supplying first state fluid energy or second state fluid energy to said second web drive means; and (d) pure fluid logic means operatively responsive to either the generation of said first fluid grasp signal or the generation of said second fluid grasp signal for supplying fourth state fluid energy to said web brake means, said pure fluid logic means further being operatively responsive to either the generation of said first fluid release signal following the generation of a said first fluid grasp signal, or the generation of said second fluid release signal following the generation of a said second fluid grasp signal for respectively supplying third state fluid energy to said web brake means.

2. A web transport device according to claim 1 wherein said web brake means comprises a stationary brake pad and a brake plenum chamber located adjacent said web path; and said pure fluid logic means comprises a single logical element having an output channel connected with said brake plenum chamber, and first and second input channels respectively connected with said first and second pure fluid amplifier means.

3. A web transport device according to claim 1 wherein said web brake means comprises a stationary first brake pad and first brake plenum chamber located adjacent said web path and a stationary second brake pad and second brake plenum chamber located adjacent said web path; and said pure fluid logic means comprises a pure fluid amplifier element having first and second control stream input channels respectively connected with said first and second pure fluid amplifier means for causing power stream flow through respective first and second power stream output channels, a first logical element having a first fluid signal output channel connected with said first brake plenum chamber and first and second fluid signal input channels respectively connected with said first power stream output channel and said second pure fluid amplifier means, and a second logical element having a second fluid signal output channel connected with said second brake plenum chamber and third and fourth fluid signal input channels respectively connected with said second power stream output channel and said first pure fluid amplifier means.

4. A web transport device according to claim 1 wherein said web brake means comprises a stationary first brake pad and first brake plenum chamber located adjacent said web path, and a stationary second brake pad and second brake plenum chamber located adjacent said web path; and said pure fluid logic means comprises a first pure fluid amplifier element having a first control stream input channel adapted to receive both of said first fluid and second fluid grasp signals and a second control stream input channel adapted to receive said second fluid release signal for causing power stream flow through respective first and second power stream output channels a second pure fluid amplifier element having a third control stream input channel adapted to receive both of said first fluid and second fluid grasp signals and a fourth control stream input channel adapted to receive said first fluid release signal for causing power stream flow through respective third and fourth power stream output channels, a first logical element having a first fluid signal output channel connected to said first brake plenum chamber and first and second fluid signal input channels respectively connected with one power stream output channel of each of said first and second pure fluid amplifier elements, and a second logical element having a second fluid signal output channel connected to said second brake plenum chamber and third and fourth fluid signal input channels respectively connected with the other power stream output channel of each of said first and second pure fluid amplifier elements.

5. A web transport device which comprises:

(a) a first drive member located adjacent a web path for moving a web grasped thereby, and a first fluid plenum chamber associated with said first drive member and adapted to receive fluid energy in either a first state or a second state for selectively creating across the web a fluid pressure gradient of either web grasping polarity or web releasing polarity, respectively;

(b) a second drive member loctaed adjacent said web path for moving a web grasped thereby, and a second fluid plenum chamber associated with said second drive member and adapted to receive fluid energy in either a first state or a second state for selectively creating across the web a fluid pressure gradient of either web grasping polarity or web releasing polarity, respectively;

(c) a stationary brake pad located adjacent said web path on one side thereof for restraining movement of a web grasped thereby, and a brake plenum chamber associated with said brake pad on said same one side and adapted to receive fluid energy in either a third state or a fourth state for selectively creating across the web a fluid pressure gradient of either web grasping polarity or web releasing polarity, respectively;

(d) a first pure fluid bistable amplifier element having first and second control stream input channels respectively adapted to receive a selectively generated first fluid grasp signal and a selectively generated first fluid release signal for respectively causing power stream flow through first and second power stream output channels thereof, with one of said first and second power stream output channels being operatively connected with said first plenum chamber so as to supply thereto first state fluid energy or second state fluid enery in response to the respective generation of said first fluid grasp signal or said first fluid release signal;

(e) a second pure fluid bistable amplifier element having third and fourth control stream input channels respectively adapted to receive a selectively generated second fluid grasp signal and a selectively generated second fluid release signal for respectively causing power stream flow through third and fourth power stream output channels thereof, with one of said third and fourth power stream output channels being connected with said second plenum chamber so as to supply thereto first state fluid energy or second state fluid energy in response to the respective generation of said second fluid grasp signal or said second fluid release signal; and (f) a pure fluid logical OR element having a fluid signal output channel connected with said brake plenum chamber, a first fluid signal input channel connected with said first power stream output channel, and a second fluid signal input channel connected with said third power stream output channel, whereby fourth state fluid energy is supplied from said fluid signal output channel to said brake plenum chamber in response to power stream flow either in said first power stream output channel or in said third power stream output channel.

6. A web transport device according to claim 5 wherein said OR element comprises a passive fluid combining junction.

7. A web transport device which comprises:

(a) a first movable drive member located adjacent a web path for moving a web grasped thereby, and a first fluid plenum chamber associated with said first drive member and adapted to receive fluid energy in either a first state or a second state for selectively creating across the web a fluid pressure gradient of either web grasping polarity or web releasing polarity, respectively;

(b) a second drive member located adjacent said web path for moving a web grasped thereby, and a second fluid plenum chamber associated with said second drive member and adapted to receive fluid energy in either a first state or a second state for selectively creating across the web a fluid pressure gradient of either web grasping polarity or web releasing polarity, respectively;

(c) a first stationary brake pad located adjacent said web path on one side thereof for restraining movement of a web grasped thereby, and a first brake plenum chamber associated with said first brake pad on said same one side and adapted to receive fluid energy in either a third state or a fourth state for selectively creating across the web a fluid pressure gradient of either web grasping polarity or web releasing polarity, respectively;

(d) a second stationary brake pad located adjacent said web path on one side thereof for restraining movement of a web grasped thereby, and a second brake plenum chamber associated with said second brake pad on the said same one side adapted to receive fluid energy in either a third state or a fourth state for selectively creating across the web a fluid pressure gradient of either web grasping polarity or web releasing polarity, respectively;

(e) a first pure fluid bistable amplifier element having first and second control stream input channels respectivley adapted to receive a selectively generated first fluid grasp signal and a selectively generated first fluid release signal for respectively causing power stream flow through first and second power stream output channels thereof, and means operatively connecting one of said first and second power stream output channels with said first plenum chamber so as to respectively supply thereto first state fluid energy or second state fluid energy in response to the respective generation of said first fluid grasp signal or said first fluid release signal;

(f) a second pure fluid bistable amplifier element having third and fourth control stream input channels respectively adapted to receive a selectively generated second fluid grasp signal and a selectively generated second fluid release signal for respectively causing power stream flow through third and fourth power stream output channels thereof, and means operatively connecting one of said third and fourth power stream output channels with said second plenum chamber so as to respectively supply thereto first state fluid energy or second state fluid energy in response to the respective generation of said second fluid grasp signal or said second fluid release signal;

(g) a third pure fluid bistable amplifier element having fifth and sixth control stream input channels for respectively causing power stream flow through fifth and sixth power stream output channels thereof, with said fifth control stream input channel being connected with said first power stream output channel, and with said sixth control stream input channel being connected with said third power stream output channel;

(h) a first pure fluid logical OR element having a first fluid signal output channel connected with said first brake plenum chamber, a first fluid signal input channel connected with said fifth power stream output channel, and a second fluid signal input channel operatively connected by means with said third power stream output chanel, whereby fourth state fluid energy is supplied from said first fluid signal output channel to said first brake plenum chamber in response to power stream flow either in said fifth power stream ouput channel or in said third power stream output channel; and (i) a second pure fluid logical OR element having a second fluid signal output channel connected with said second brake plenum chamber, a third fluid signal input channel connected with said sixth power stream output channel, and a fourth fluid signal input channel operatively connected by means with said first power stream output channel, whereby fourth state fluid energy is supplied from said second fluid signal output channel to said second brake plenum chamber in response to power stream flow either in said first power stream output channel or in said sixth power stream output channel.

8. A web transport device according to claim 7 wherein each said OR element comprises a passive fluid combining junction.

9. A web transport device according to claim 7 wherein said means operatively connecting one of said first and second power stream output channels with said first plenum chamber comprises a fourth pure fluid amplifier, and said means operatively connecting one of said third and fourth power stream output channels with said second plenum chamber comprises a fifth pure fluid amplifier.

10. A web transport device according to claim 9 wherein said second fluid signal input channel is connected with a power stream output channel of said fourth fluid amplifier whose associated control stream input channel in turn is connected with said first power stream output channel; and said fourth fluid signal input channel is connected with a power stream output channel of said fifth fluid amplifier whose associated control stream input channel in turn is connected with said third power stream output channel.

11. A web transport device according to claim 10 wherein each said OR element comprises a passive fluid combining junction.

12. A web transport device which comprises:

(a) a first drive member located adjacent a web path for moving a web grasped thereby, and a first fluid plenum chamber associated with said first drive member and adapted to receive fluid energy in either a first state or a second state for selectively creating across the web a fluid pressure gradient of either web grasping polarity or web releasing polarity, respectively;

(b) a second drive member located adjacent said web path for moving a web grasped thereby, and a second fluid plenum chamber associated with said second drive member and adapted to receive fluid energy in either a first state or a second state for selectively creating across the web a fluid pressure gradient of either web grasping polarity or web releasing polarity, respectively;

(c) a first stationary brake pad located adjacent said web path on one side thereof for restraining movement of a web grasped thereby, and a first brake plenum chamber associated with said first brake pad on said same one side and adapted to receive fluid energy in either a third state or a fourth state for selectively creating across the web a fluid pressure gradient of either web grasping polarity or web releasing polarity, respectively;

(d) a second stationary brake pad located adjacent said web path on one side thereof for restraining movement of a web grasped thereby, and a second brake plenum chamber associated with said second brake pad on the said same one side and adapted to receive fluid energy in either a third state or a fourth state for selectively creating across the web a fluid pressure gradient of either web grasping polarity or web releasing polarity, respectively;

(e) a first pure fluid bistable amplifier element having first and second control stream input channels respectively adapted to receive a selectively generated first fluid grasp signal and a selectively generated first fluid release signal for respectivley causing power stream flow through first and second power stream output channels thereof, with one of said first and second power stream output channels being connected with said first plenum chamber so as to respectively support thereto first state fluid energy or second state fluid energy in response to the respective generation of said first fluid grasp signal or said first fluid release signal;

(f) a second pure fluid bistable amplifier element having third and fourth control stream input channels respectively adapted to receive a selectively generated second fluid grasp signal and a selectively generated second fluid release signal for respectively causing power stream flow through third and fourth power stream output channels thereof, with one of said third and fourth power stream output channels being connected with said second plenum chamber so as to respectively supply thereto first state fluid energy or second state fluid energy in response to the respective generation of said second fluid grasp signal or said second fluid release signal;

(g) a third pure fluid bistable amplifier element having fifth and sixth control stream input channels for respectively causing power stream flow through fifth and sixth power stream output channels thereof, with said sixth control stream input channel being adapted to receive said selectively generated second fluid release signal;

(h) a fourth pure fluid bistable amplifier element having seventh and eighth control stream input channels for respectively causing power stream flow through seventh and eighth power stream output channels thereof, with said eighth control stream input channel being adapted to receive said selectively generated first fluid release signal;

(i) a first pure fluid logical OR element having a first fluid signal output channel connected to said fifth control stream input channel, a first fluid signal input channel adapted to receive said selectively generated first fluid grasp signal, and a second fluid signal input channel adapted to receive said selectively generated second fluid grasp signal;

(j) a second pure fluid logical OR element having a second fluid signal output channel connected to said seventh control stream input channel, a third fluid signal input channel adapted to receive said selectively generated first fluid grasp signal, and a fourth fluid signal input channel adapted to receive said selectively generated second fluid grasp signal;

(k) a third pure fluid logical OR element having a third fluid signal output channel connected to said fifth power stream output channel, and a sixth fluid signal input channel connected to said eighth power stream output channel, whereby fourth state fluid energy is supplied from said third fluid signal output channel to said first brake plenum chamber in response to power stream flow either in said fifth power stream output channel or in said eighth power stream output channel; and (l) a fourth pure fluid logical OR element having a fourth fluid signal output channel connected to said second brake plenum chamber, a seventh fluid signal input channel connected with said sixth power stream output channel, and an eighth fluid input channel connected to said seventh power stream output channel, whereby fourth state fluid energy is applied from said fourth fluid signal output channel to said second brake plenum chamber in response to power stream flow either in said sixth power stream output channel or in said seventh power stream output channel.

13. A web transport device according to claim 12 wherein each said OR element comprises a passive fluid combining junction.

14. A web transport device which comprises:

(a) first and second web drive means each located adjacent a web path for moving a web grasped thereby, with each said drive means being adapted to receive fluid energy in either a first state or a second state for selectively creating across the web a fluid pressure gradient of either web grasping polarity or web releasing polarity, respectively;

(b) web brake means located adjacent said web path for restraining movement of a web grasped thereby, said web brake means being adapted to receive fluid energy in either a third state or a fourth state for selectively creating across the web a fluid pressure gradient of either web grasping polarity or web releasing polarity, respectively;

(c) first pure fluid amplifier means responsive to either a selectively generated first fluid grasp signal or a selectively generated first fluid release signal for respectively supplying first state fluid energy or second state fluid energy to said first web drive means; and second pure fluid amplifier means responsive to either a selectively generated second fluid grasp signal or a selectively generated second fluid release signal for respectively supplying first state fluid energy or second state fluid energy to said second web drive means;

(d) pure fluid logic means operatively responsive to either the generation of said first fluid grasp signal or the generation of said second fluid grasp signal for supplying fourth state fluid energy to said web brake means, said pure fluid logic means further being operatively responsive to either the generation of said first fluid release signal following the generation of said first fluid grasp signal, or the generation of said second fluid release signal following the generation of a said second fluid grasp signal, for respectively supplying third state fluid energy to said web brake means; and (e) a pure fluid signal generator adapted to receive a first fluid command and responsive to successive applications thereof for alternately generating said first fluid grasp signal and said first fluid release signal, and adapted to receive a second fluid command and responsive to successive applications thereof for alternately generating said second fluid grasp signal and said second fluid release signal, with said pure fluid signal generator further simultaneously generating both said first fluid release signal and said second fluid grasp signal in response to an applied said second fluid command following an applied said first fluid command which in turn generated said first fluid grasp signal, and simultaneously generating both said first fluid grasp signal and said second fluid release signal in response to an applied said first fluid command following an applied said second fluid command which in turn generated said second fluid grasp signal.

15. A web transport device according to claim 14 wherein said pure fluid signal generator comprises in combination a first pure fluid bistable circuit having first and second control input channels respectively adapted to receive fluid such that said first bistable circuit, if in respective first and second stable states, is switched to the opposite stable state and respectively generates said first fluid grasp signal and said first fluid release signal at respective first and second output channels thereof, a second pure fluid bistable circuit having third and fourth control input channels respectively adapted to receive fluid such that said second bistable circuit if in respective first and second stable state and respectively generates said second fluid grasp signal and said second fluid release signal at respective third and fourth output channels, first means for simultaneously applying said first fluid command to said first, second, and fourth control input channels, and second means for simultaneously applying said second fluid command to said second, third, and fourth control input channels.

16. A web transport device according to claim 15 wherein said web brake means comprises a stationary brake pad and a brake plenum chamber located adjacent said web path; and said pure fluid logic means comprises a single logical element having an output channel connected with said brake plenum chamber, and first and second input channels respectively connected with said first and second pure fluid amplifier means.

17. A web transport device according to claim 15 wherein said web brake means comprises a stationary first brake pad and first brake plenum chamber located adjacent said web path and a stationary second brake pad and second brake plenum chamber located adjacent said web path; and said pure fluid logic means comprises a pure fluid amplifier element having first and second control stream input channels respectively connected with said first and second pure fluid amplifier means for causing power stream flow through respective first and second power stream output channels, a first logical element having a first fluid signal output channel connected with said first brake plenum chamber and first and second fluid signal input channels respectively connected with said first power stream output channel and said second pure fluid amplifier means, and a second logical element having a second fluid signal output channel connected with said second brake plenum chamber and third and fourth signal input channels respectively connected with said second power stream output channel and said first pure fluid amplifer means.

18. A web transport device according to claim 15 wherein said web brake means comprises a stationary first brake pad and first brake plenum chamber located adjacent said web path, and a stationary second brake pad and second brake plenum chamber located adjacent said web path; and said pure fluid logic means comprises a first pure fluid amplifier element having a first control stream input channel adapted to receive both of said first fluid and second fluid grasp signals and a second control stream input channel adapted to receive said second fluid release signal for causing power stream flow through respective first and second power stream output channels, a second pure fluid amplifier element having a third control stream input channel adapted to receive both of said first fluid and second fluid grasp signals and a fourth control stream input channel adapted to receive said first fluid release signal for causing power stream flow through respective third and fourth power stream output channels, a first logical element having a first fluid signal output channel connected to said first brake plenum chamber and first and second fluid signal input channels respectively connected with one power stream output channel of each of said first and second pure fluid amplifier elements, and a second logical element having a second fluid signal output channel connected to said second brake plenum chamber and third and fourth fluid signal input channels respectively connected with the other power stream output channel of each of said first and second pure fluid amplifier elements.

19. Pure fluid signal generator means which comprises:

(a) a first pure fluid bistable amplifier element having first and second control stream input channels for respectively causing power stream flow through first and second power stream output channels thereof;

(b) a second pure fluid bistable amplifier element having a first power stream input channel connected to said first power stream output channel, third and fourth power stream output channels, and at least a third control stream input channel for causing power stream flow through said third power stream output channel which in turn is adapted for connection with utilization means;

(c) a third pure fluid bistable amplifier element having a second power stream input channel connected to said second power stream output channel, fifth and sixth power stream output channels, and at least a fourth control stream input channel for causing power stream flow through said fifth power stream output channel which in turn is adapted for connection with utilization means;

(d) first means for causing power stream flow in said fourth and sixth power stream output channels only during the absence of fluid in the respective third and fourth control stream input channels;

(e) second means to simultaneously apply a fluid signal of temporary duration to said third and to said fourth control stream input channels; and (f) a first fluid feedback delay channel connected between said third power stream output channel and said second control stream input channel, and a second fluid feedback delay channel connected between said fifth power stream output channel and said first control stream input channel, where each said feedback channel has a time delay characteristic greater than the duration of said fluid signal.

20. A fluid signal generator according to claim 19 wherein said first means comprises a fifth control stream input channel to said second pure fluid bistable amplifier element which is connected to a source of biasing fluid, and a sixth control stream input channel to said third pure fluid bistable amplifier element which is connected to said source of biasing fluid.

21. Pure fluid signal generator means which comprises:

(a) a first pure fluid bistable circuit means having first and second control input channels respectively adapted to receive fluid such that said first bistable circuit, if in respective first and second stable states, is switched to the opposite stable state and respectively generates first and second fluid signals at respective first and second output channels thereof;

(b) a second pure fluid bistable circuit means having third and fourth control input channels respectively adapted to receive fluid such that said second bistable circuit, if in respective first and second stable states, is switched to the opposite stable state and respectively generates third and fourth fluid signals at respective third and fourth output channels thereof;

(c) first means for simultaneously applying a selectively generated first fluid command to said first, second, and fourth control input channels; and (d) second means for simultaneously applying a selectively generated second fluid command to said second, third, and fourth control input channels.

22. Pure fluid signal generator means which comprises:

(a) a first pure fluid bistable amplifier element having first and second control stream input channels for respectively causing power stream flow through first and second power stream output channels thereof;

(b) a second pure fluid bistable amplifier element having a first power stream input channel connected to said first power stream output channel, third and fourth power stream output channels, and at least a third control stream input channel for causing power stream flow through said third power stream output channel which in turn is adapted for connection with utilization means;

(c) a third pure fluid bistable amplifier element having a second power stream input channel connected to said second power stream output channel, fifth and sixth power stream output channels, and at least a fourth control stream input channel for causing power stream flow through said fifth power stream output channel which in turn is adapted for connection with utilization means;

(d) a fourth pure fluid bistable amplifier element having fifth and sixth control stream input channels for respectively causing power stream flow through seventh and eighth power stream output channels thereof;

(e) a fifth pure fluid bistable amplifier element having a third power stream input channel connected to said seventh power stream output channel, and ninth and tenth power stream output channels, and at least a seventh control stream input channel for causing power stream flow through said ninth power stream output channel which in turn is adapted for connection with utilization means;

(f) a sixth pure fluid bistable amplifier element having a fourth power stream input channel connected to said eighth power stream output channel, eleventh and twelfth power stream output channels, and at least an eighth control stream input channel for causing power stream flow through said eleventh power stream outpu channel which in turn is adapted for connection with a utilization means;

(g) first means for causing power stream flow in said fourth, sixth, tenth, and twelfth power stream output channels only during the absence of fluid in the respective third, fourth, seventh, and eighth control stream input channels;

(h) a first pure fluid logical OR element having a first fluid signal output channel connected with said fourth control stream input channel, a first fluid signal input channel, and a second fluid signal input channel;

(i) a second pure fluid logical OR element having a second fluid signal output channel connected with said eighth control stream input channel, a third fluid signal input channel, and a fourth fluid signal input channel;

(j) second means to simultaneously apply a first fluid signal of temporary duration to said third control stream input channel, to said first fluid input signal channel, and to said fourth fluid signal input channel;

(k) third means to simultaneously apply a second fluid signal of temporary duration to said seventh control stream input channel, to said third fluid signal input channel, and to said second fluid signal input channel; and (l) a first feedback delay channel connected between said third power stream output channel and said second control stream input channel, a second fluid feedback delay channel connected between said fifth power stream output channel and said first control stream input channel, a third fluid feedback delay channel connected between said ninth power stream output channel and said sixth control stream input channel, and a fourth fluid feedback delay channel connected between said eleventh power stream output channel and said fifth control stream input channel, where each said feedback channel has a time delay characteristic greater than the duration of either said first or said second fluid signals.

23. A fluid signal generator means according to claim 22 wherein each said OR element comprises a passive fluid combining junction.

24. A fluid signal generator means according to claim 22 wherein said first means comprises in combination a ninth control stream input channel to said second amplifier element, a tenth control stream input channel to said third amplifier element, an eleventh control stream input channel to said fifth amplifier element, a twelfth control stream input channel to said sixth amplifier element, and a source of biasing fluid connected to each of said four last named control stream input channels.

References Cited by the Examiner

UNITED STATES PATENTS

| | | | |
|---|---|---|---|
| 3,075,679 | 1/1963 | Wadey | 137—81.5 X |
| 3,093,283 | 6/1963 | Hodges | 226—95 |

M. HENSON WOOD, Jr., *Primary Examiner.*

J. N. ERLICH, *Assistant Examiner.*